United States Patent [19]

Huebner

[11] 4,089,782
[45] May 16, 1978

[54] REVERSIBLE FLOW, INCLINED PLATE CLARIFIER

[76] Inventor: Werner P. E. Huebner, 6 Sweetbriar Court, Toronto, Ontario, Canada, M4A 2G5

[21] Appl. No.: 641,465

[22] Filed: Dec. 17, 1975

[51] Int. Cl.² .................. B01D 21/10; B01D 21/01
[52] U.S. Cl. .................................. 210/206; 210/522; 210/519
[58] Field of Search .............. 210/521, 522, 519, 525, 210/83, 84, 322, 532, 533, 534, 537, 538, 540, 206, 205

[56] References Cited

U.S. PATENT DOCUMENTS

| | | | |
|---|---|---|---|
| 3,182,799 | 5/1965 | Krofta | 210/521 X |
| 3,552,554 | 1/1971 | Olgard | 210/521 X |
| 3,687,298 | 8/1972 | Rozkydalek | 210/522 X |
| 3,782,557 | 1/1974 | Pielkenrood | 210/521 |
| 3,794,167 | 2/1974 | Olgard et al. | 210/522 X |
| 3,797,668 | 3/1974 | Pielkenrood et al. | 210/522 |
| 3,813,851 | 6/1974 | Eder | 210/521 X |
| 3,837,501 | 9/1974 | Pielkenrood | 210/522 |
| 3,894,955 | 7/1975 | Forsell | 210/522 X |
| 3,919,084 | 11/1975 | Bebech | 210/521 X |
| 3,951,817 | 4/1976 | Snyder | 210/521 |

*Primary Examiner*—Frank W. Lutter
*Assistant Examiner*—Richard L. Chiesa
*Attorney, Agent, or Firm*—Fitch, Even, Tabin & Luedeka

[57] ABSTRACT

Various improvements in a clarifier having inclined flow passages, the clarifier being capable of reversible operation wherein liquid to be clarified may be selectively caused to flow either upwardly or downwardly through the flow passages. The clarifier has channels adjacent the tops of the flow passages for collecting a relatively low density phase and a unique flow control trough simultaneously regulating liquid flow through a manifold above the flow passages while also forming an outlet passage for the low density phase. A vertical flow manifold with an overflow arrangement regulates flow between the lower ends of the flow passages and a flow conduit external of the clarifer. Means at either end of the flow channels may collect multiple phases, an intermediate phase preferably being recycled to improve either the rate or quality of clarification. Finally, the clarifier includes a combined support structure and flocculating chamber as well as a seal arrangement for facilitating mounting of the inclined plates within the housing. The clarifier is operable in a downflow mode with one or more low density phases being removed at the top of the inclined passages.

13 Claims, 16 Drawing Figures

REVERSIBLE FLOW, INCLINED PLATE CLARIFIER

BACKGROUND OF THE INVENTION

The present invention relates to clarifiers of a type wherein flow passages are formed between a plurality of inclined plates. The invention is particularly concerned with one or more improvements for facilitating operation of the clarifier in a wide variety of applications while also permitting simplified construction of the clarifier in order to minimize initial cost, reduce the need for complex operating procedures and to facilitate maintenance of the clarifier.

In the past, the most widely used clarifiers or settlers have been in the form of large basins, tanks or the like where the liquid to be clarified is held until one or more selected phases separate because of sedimentation rates or phase separation phenomenon. Generally, large basins or tanks have been employed where liquid to be clarified includes solids which tend to separate under the effects of gravity given a sufficient standing time.

Such basins or similar arrangements are commonly employed in water treatment and sewage disposal facilities, for example. These facilities depend upon relatively long holding periods in order to accomplish separation and are characterized by a requirement for excessive amounts of volume. This need for excessive storage volume and operating space may undesirably affect operating costs, particularly initial installation costs. In addition, many plant facilities which require clarifying or settling operations simply do not have the necessary space for the installation of large settling basins or tanks.

One solution to this problem has been the development of inclined passage clarifiers. Clarifiers of this type are commonly characterized by a number of angled flow passages or channels formed, for example, by a plurality of inclined plates. Liquid flowing between the plates is subject to phase separation under conventional principles of operation. The particular utility of such clarifiers is based upon the well known fact that the depth of a simple gravity settler or clarifier has little, if any, bearing on its effective rate of operation. The most significant value in the design of a gravity settler is its available settling area.

The concept of employing a series of inclined passages in close proximity to each other has been found to be one of the most effective means for increasing the settling area per unit volume while at the same time reducing overall size and cost for a clarifier or settling unit.

With the inclined passage concept, the effective gravity settling area becomes the horizontally projected area of all of the passages. As a result, a very substantial settling area may be made availabe relative to the surface area occupied by the clarifier or settler. Overall flow rates for liquid passing through conventional open settling basins and the like can, in general, be applied to the sizing of inclined plate clarifiers by substituting the "projected area" for the "surface settling area" of the conventional open clarifier. This distinct advantage, made possible by the general configuration of inclined plate clarifiers or settlers, is tending to increase their use in many applications.

Operation of inclined plate clarifiers may be further enhanced in various ways to increase the rate and/or quality of clarification. Such capabilities are of particular importance because of the wide variety of operating conditions which may be encountered and the variety of liquids to be clarified. For example, in some applications, liquids to be clarified may have varying amounts of suspended solids ranging from heavy material tending to settle out very rapidly to light materials which are difficult to separate and may in some instances require the use of flocculating agents. Liquids to be clarified may require the removal of a relatively low density phase such as oils suspended in water. The liquid may either be aqueous or nonaqueous and, in some instances, may include both solids subject to settling under the effects of gravity as well as one or more low density phases which must be separated in order to produce a clarified liquid of satisfactory quality.

The prior art includes numerous examples of various inclined passage clarifiers or settlers for treating one or more liquids of the type discussed above. For example, it is known in the prior art that, under certain conditions, it is preferable to employ an "upflow" mode of operation wherein the liquid to be clarified is introduced adjacent the bottoms of the inclined passages wiht clarified liquid being removed at some point toward the top of the clarifier.

Under other conditions, it has been found preferable to employ a "downflow" mode of operation wherein the liquid to be clarified is introduced at the top of the clarifier or settler with the clarified liquid being removed from a lower portion of the clarifier.

Numerous other modifications have been developed within such inclined passage clarifiers or settlers to further enhance clarification of liquids in various applications. However, it has commonly been the case that the clarifier or settler must be uniquely tailored to the particular application where the clarifier is being used. Accordingly, the cost of designing and installing the clarifiers has tended to be substantial. For the same reasons, operating procedures for such clarifiers have tended to vary widely in different applications and under different operating conditions.

Another problem particularly contemplated by the present invention concerns the removal of low density liquids or solids from a liquid to be clarified. The most common example of this would be an aqueous liquid including oils or possibly low density petroleum solids. Such a situation commonly arises in various waste waters or due to accidental spills caused by the rupture of oil lines or the like. Because of constantly changing environmental criteria which may permit only a few parts per million of such impurities in the effluent, it is necessary to provide more efficient and economical equipment to handle the treatment of such liquids.

In the past, one solution to the removal of oils or low density solids within an inclined passage clarifier has required operation of the clarifier in an upflow mode with liquid to be clarified and the low density oils or solids being separated and removed at the top of the passages. Complete removal of the low density solids or liquids in such a mode of operation has been difficult because of what may be termed a "wiping" effect. Such as effect tends to occur in the final phases of removal where a large portion of the low density solids or liquids has been removed from the effluent. If the liquid to be clarified, in these final stages, is in close proximity to the low density solids or liquids being removed, there is a tendency for the liquid to pick up or retain a small portion of the low density liquids or solids. This effect is referred to as "wiping" and may occur if the liquid to be clarified is moving in either the same direction or the opposite direction from the low density liquids or solids.

Thus, there has been found to remain a need for a versatile inclined passage clarifier permitting the use of a single clarifier design or at least only a slightly modified design in a widely varying number of applications under different operating conditions.

SUMMARY OF THE INVENTION

It is a general object of the present invention to provide an inclined passage clarifier for overcoming one or more problems of the type discussed above.

More specifically, it is a particular object of the present invention to provide a clarifier or settler of a type including a plurality of inclined plates forming flow passages therebetween, the clarifier being reversibly operable in either an "upflow" or "downflow" mode of operation.

This object has been accomplished through the provision of a unique manifold flow arrangement in communication with both the upper and lower ends of the inclined passages. In particular, the first and second manifold flow means in respective communication with the upper and lower ends of the inclined passages both include overflow control means which are operable in either direction of fluid flow. Accordingly, the two overflow control arrangements assure uniform distribution of liquid to be clarified throughout the passages while also closely regulating the exit rate for liquid from the passages. In this manner, it is possible to closely regulate the "standing time" during which liquid to be clarified remains within the inclined passages. At the same time, the rate of liquid flow through the passages may be closely controlled in order to avoid or minimize undesirable agitation or turbulence.

It is a further object of the invention to provide a reversible flow, inclined passage clarifier including additional features such as the provision of novel means for collecting a low density phase at the upper ends of the inclined passages.

It is an even further object of the invention to provide a reversible flow clarifier wherein the overflow control means arranged in a manifold at the upper ends of the inclined passages performs the combined functions of regulating liquid flow through the manifold, in either an upflow or downflow mode of operation, while also serving as a means for facilitating the removal of a low density phase.

It is another specific object of the invention to provide a clarifier including a plurality of inclined flow passages with unique collection means for receiving a low density phase at the upper ends of the inclined passages, the means for collecting and receiving the low density phase being integrally formed by means which also serve to regulate the flow of liquid through a manifold formed above the inclined passages.

It is an even more specific object of the invention to provide such a combined flow control means and low density phase collection means in the form of a trough having spaced apart side walls and an inclined floor, the trough being in communication above the inclined floor with liquid flowing through the manifold arranged above the inclined passages, the trough also being in communication below the inclined floor with means for collecting a low density phase from the inclined passages.

It is another particular object of the invention to provide a clarifier including a relatively simple manifold arrangement for collecting a low density phase from the inclined passages. In this instance, the inclined passages are formed by a plurality of spaced apart inclined plates with a low density phase collection means extending along the underside of each inclined plate, a low density collection manifold being formed toward one lateral end of the inclined plates by vertical plate arranged above and extending perpendicular to the inclined plates, the low density collection manifold formed by the vertical plate being in communication with the low density phase collection means for each of the inclined passages.

It is another specific object of the invention to provide a clarifier wherein flow passages are formed between a plurality of inclined plates, the clarifier being further characterized by means permitting selective communication between the lower ends of the inclined passages with a vertical manifold including overflow weir means for regulating liquid flow between the lower ends of the inclined passages and an external conduit of the clarifier.

This object is particularly accomplished by the use of divider plates mounted in spaced apart relation from the underside of each inclined plate adjacent the lower ends thereof and forming a divided flow region between the divided plates and the lower end of the inclined plate, the divided flow region for each inclined passage being in communication with the vertical manifold.

It is a further specific object of the invention to provide a clarifier having a plurality of inclined flow passages formed by parallel, spaced apart plates with means arranged at either the upper or lower ends of the inclined passages to permit multiple phase separation and collection.

In connection with this specific object, multiple phase separation is preferably accomplished by a pair of parallel divider plates mounted in spaced apart relation to each other and the underside of each inclined plate to form two divided flow regions with separate manifold means being in communication with the two divided flow regions.

It is an even more specific object within a clarifier of the type described immediately above wherein an intermediate phase received from one of the divided flow regions is recirculated in order to increase the rate and/or quality of clarification.

It is also an even more specific object of the invention to provide a clarifier of the type described immediately above wherein multiple phase separation and collection means are provided at both the upper and lower ends of the inclined passages.

It is also a specific object of the invention to provide a clarifier of the type including an inlet manifold above its clarifier section, a hollow support structure for the clarifier housing also internally forming a vertical chamber for the introduction of flocculating material into the liquid to be clarified.

It is yet another specific object of the invention to provide a clarifier having inclined flow passages formed by parallel spaced apart plates with a simplified mechanism being employed to facilitate mounting of the plates within a clarifier housing and to also facilitate the development of a liquid seal between one of the inclined plates and a similarly inclined wall of the housing.

It is an even more specific object of the invention to provide such a sealing arrangement in the form of a pair of U-shaped channel members arranged in respective engagement with the one inclined plate and the similarly inclined housing wall, the U-shaped channels facing and overlapping each other to form a closed column, expandable means being arranged within the closed column to urge the U-shaped channel members apart into respective engagement with the one inclined plate and the similarly inclined housing wall.

Finally, it is an object of the invention to provide a method of operating an inclined passage clarifier wherein a liquid to be clarified initially includes low density liquids and/or solids, the liquids to be clarified being passed through the clarifier in a downflow mode of operation, the low density material being collected at the upper ends of the inclined passages, the flow rate and other operating characteristics of the clarifier being selected so that substantially all of the low density material is removed from the liquid to be clarified substantially above the lower ends of the inclined passages. In this manner, the "wiping" effect referred to above may be eliminated or minimized and a very high quality effluent may be produced.

Additional objects and advantages of the present invention are made apparent in the following description having reference to the accompanying drawings.

DESCRIPTION OF THE PREFERRED EMBODIMENTS

As was also indicated above, the present invention relates to a clarifier of a type including a number of inclined flow passages, the clarifier being characterized by a number of features particularly contemplated for simplifying construction of the clarifier and adapting it for versatile use in a large number of applications while enhancing the rate and/or quality of clarification.

Accordingly, before proceeding with a more detailed description of the clarifier, its construction and mode of operation, the major features of the clarifier are summarized immediately below in order to facilitate an understanding of the invention.

Initially, the invention contemplates a uniquely versatile clarifier or settler capable of reversible operation in either a downflow or upflow mode of operation. In this conection, the term "upflow" is employed only to indicate that the major direction of flow within the clarifier, for liquid to be clarified, takes place in an upward direction at least through the inclined flow passages formed by the parallel plates. Similarly, the term "downflow" is intended only to indicate that the major direction of flow for liquid to be clarified takes place in a downward direction at least through the inclined flow passages.

Those features of the clarifier which contribute to its reversible operation are illustrated for example in FIGS. 1–4, 7 and 8. The schematic representation of FIGS. 5 and 6, respectively, illustrate operation of the clarifier in upflow and downflow modes of operation respectively.

In connection with the reversible operation of the clarifier, the present invention also contemplates use of a vertical manifold chamber in communication with the lower ends of the inclined passages. Such a vertical manifold permits overflow control means to be arranged in both the vertical manifold and the manifold at the upper ends of the inclined passages in order to assure precise regulation of liquid levels throughout the entire clarifier while preventing the possibility of evacuation of the clarifier, for example, by siphon action. In addition, the vertical manifold arrangement in communication with the lower ends of the inclined passages permits an external conduit to be in communication with the vertical manifold at substantially any desired vertical level of the clarifier.

An additional feature which may be employed either with the reversible clarifier described above or with a number of other clarifier designs comprises an overflow control means in the manifold arranged above the inclined passages, the overflow control means also including integral means for receiving and collecting a low density phase such as oil. In this connection, an alternate embodiment of an arrangement for collecting a low density phase such as oil is also illustrated in FIGS. 12 and 13.

Figure 7:
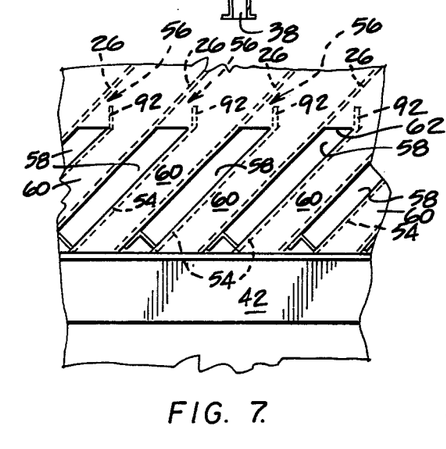
FIG. 7 is an enlarged fragmentary view taken along section line VII—VII of FIG. 4.
Figure 8:
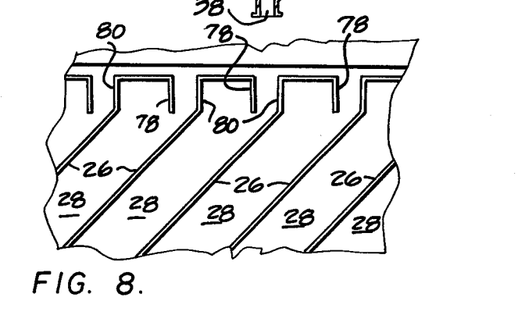
FIG. 8 is similarly an enlarged, fragmentary view taken along section line VIII—VIII of FIG. 4.
Figure 9:
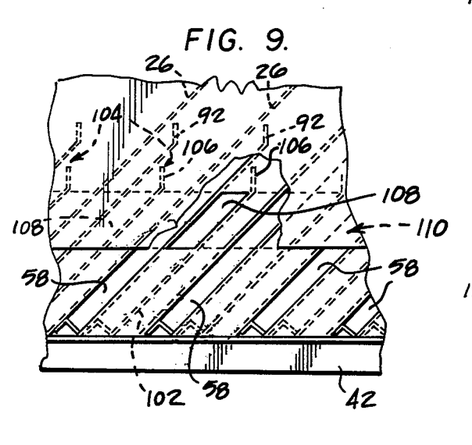
FIG. 9 is a view similar to FIG. 7 while illustrating a unique multiple phase separator and collection arrangement according to the present invention.
Figure 10:
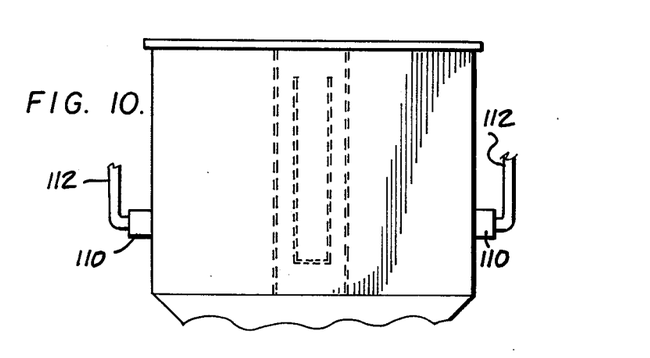
FIG. 10 is a fragmentary view of the clarifier, similar to FIG. 4, while illustrating additional manifold means for receiving divided liquid flow from the multiple phase separator and collection arrangement of FIG. 9.
Figure 11:
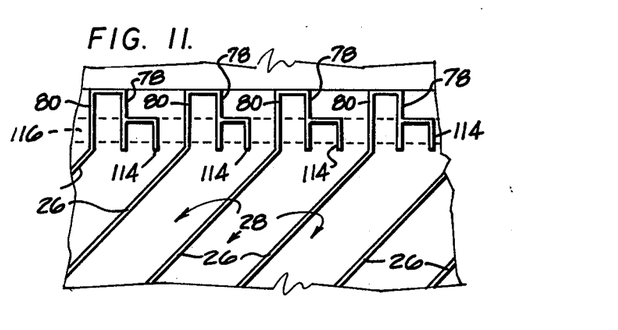
FIG. 11 is an enlarged fragmentary view similar to FIG. 8 while illustrating a similar multiple phase separation and collection arrangement at the upper ends of the inclined flow passages.

Yet another important feature of the invention which may be employed either with reversible clarifier of FIGS. 1–8 or with other clarifier arrangements is illustrated in FIGS. 9–11 wherein multiple phase separation means are employed at the lower and/or upper ends of the inclined passages in order to remove a plurality of phases from the main liquid flow taking place either upwardly or downwardly through the inclined flow passages. Such a multiple phase collection arrangement for the lower ends of the inclined passages is illustrated in FIG. 9 with a suitable manifold means being illustrated in FIG. 10. A similar multiple phase collection arrangement at the upper ends of the inclined passages is illustrated in FIG. 11.

Figures 12, 13, 14, 15, 16:
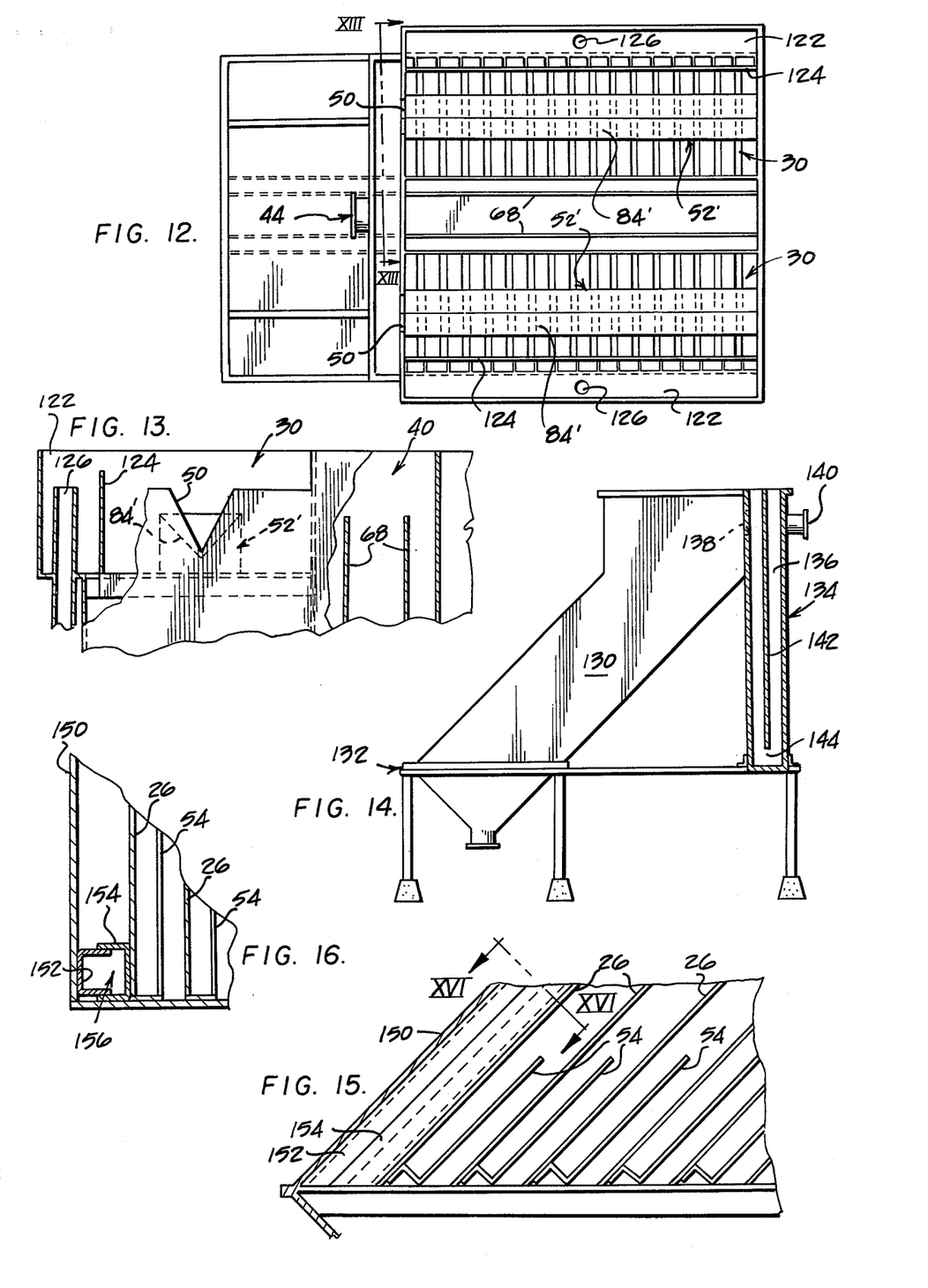
FIG. 12 is a plan view of an alternate embodiment including low density phase collection means along the lateral edges of the inclined plates.
FIG. 13 is an enlarged fragmentary view taken along section line XIII—XIII of FIG. 12.
FIG. 14 is a side view of yet another embodiment of the clarifier of the present invention including a novel combination support column for the upper end of the clarifier with an internal flocculating chamber.
FIG. 15 is an enlarged fragmentary view generally similar to FIG. 7 but adjacent an inclined wall of the clarifier housing.
FIG. 16 is a fragmentary view taken along section line XVI—XVI of FIG. 15.

Yet another embodiment of the clarifier is illustrated in FIG. 14. The clarifier of FIG. 14 may be the reversible unit discussed above in connection with FIGS. 1–8 or any other variety of inclined flow passage clarifier. The only limitation for the clarifier of FIG. 14 is that it has an inlet manifold at the upper end of the flow passages. The clarifier of FIG. 14 is characterized by a combined support arrangement for the upper end of the clarifier which internally forms a vertical column permitting the introduction of flocculating material into liquid to be clarified prior to its introduction into the manifold at the upper end of the clarifier.

Finally, the present invention particularly contemplates the use of an inclined flow passage clarifier wherein the passages are formed by a plurality of spaced apart inclined plates. Such a configuration is of particular advantage since it permits modular construction of the clarifier by the simple arrangement of a number of the spaced apart plates within a clarifier section of a housing. FIGS. 15 and 16 illustrate a seal arrangement for maintaining effective liquid sealing engagement between one of the inclined plates and a similarly inclined wall of the clarifier housing.

Numerous other features of the invention are described below in the more detailed discussion of the drawings. The immediately preceding summary is intended only to facilitate an understanding of the various aspects of the invention.

Figures 1, 2, 3, 4:
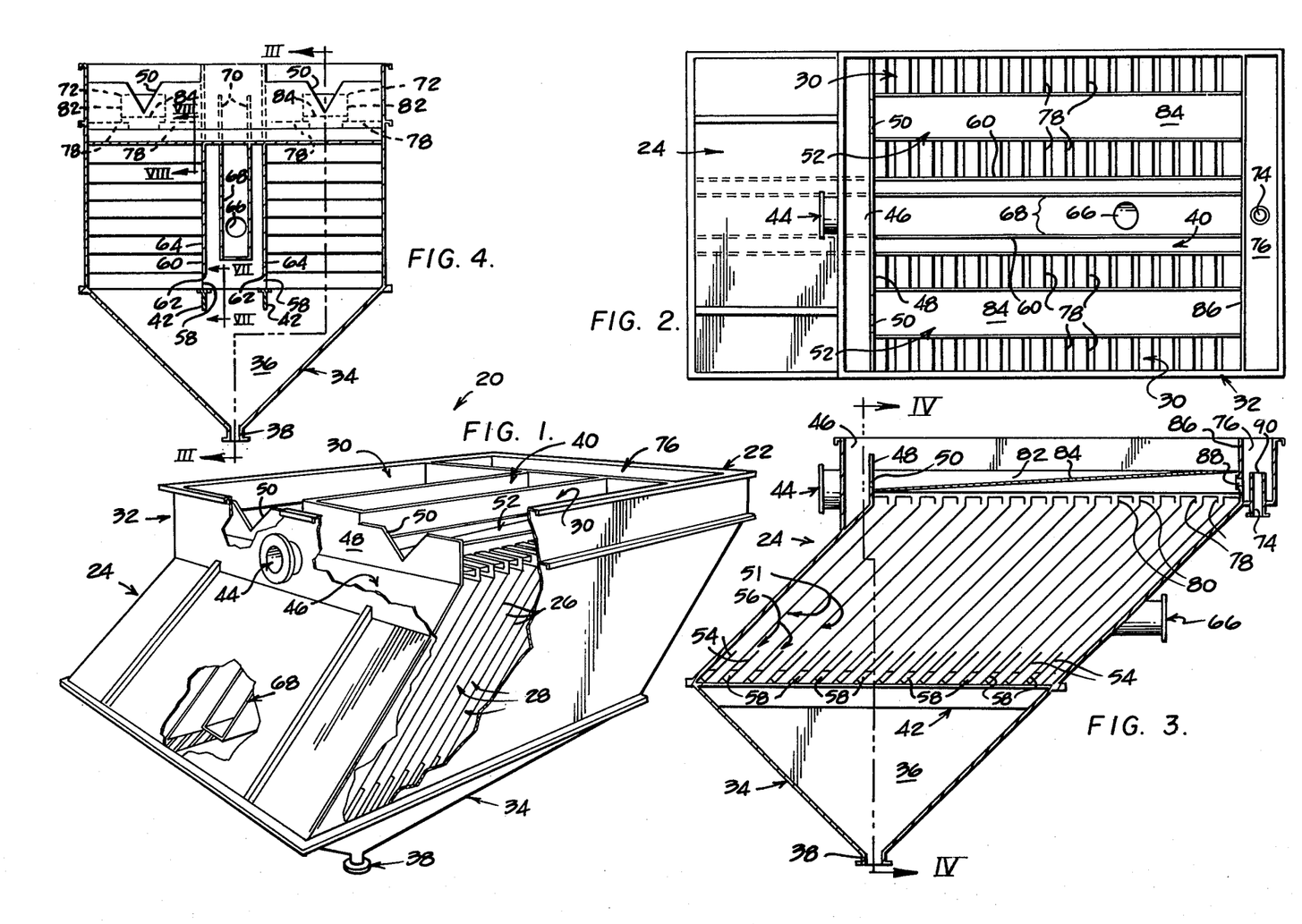
FIG. 1 is an isometric view of a clarifier or settler in accordance with the present invention, parts being sectioned to better illustrate its internal construction.
FIG. 2 is a plan view of the clarifier of FIG. 1.
FIG. 3 is a centrally sectioned longitudinal view in elevation of the clarifier, taken along section line III—III of FIG. 4.
FIG. 4 is a similarly sectioned lateral view in elevation of the clarifier, taken along section line IV—IV of FIG. 3.

Referring now to the drawings and particularly to FIG. 1, the clarifier of the present invention is generally indicated at 20 within a fabricated housing 22. The housing 22 includes a clarifying section 24 wherein a plurality of parallel, spaced-apart plates 26 are arranged to form inclined flow passages 28. The clarifying section 24 of the housing is characterized in cross-section by a trapezoidal configuration as may be best seen in FIG. 3.

Manifold flow means forming inlet and outlet chambers are arranged in respective communication with the upper and lower ends of the inclined flow passages. Because the reversible mode of operation contemplated for the present clarifier, it is important to note that the manifold flow means in communication with the upper and lower ends of the flow passages may alternatively function as either an inlet or outlet. In any event, a first manifold flow means comprises multiple chambers 30 which are in communication with the upper ends of the inclined flow passages. A lower portion 34 of the housing defines a conventional sedimentation chamber 36 with outlet means indicated at 38.

The housing 22 also includes a second manifold flow means 40 in communication with the lower end of the inclined flow passages. The second manifold flow means is a vertical chamber formed along the length of the clarifying section 24 and extending vertically into the upper housing section 32.

Within the following detailed description, many components of the clarifier are identified primarily by terms corresponding to operation of the clarifier in a downflow mode. This convention is employed only for the purpose of describing construction of the clarifier.

Referring now to FIGS. 1–4, the parallel spaced-apart plates 26 are mounted within the clarifying section 24 of the housing by support rails indicated at 42.

Liquid to be clarified is introduced into the clarifier through an inlet or external conduit 44 which is in communication with a common feedbox 46. The feedbox 46 is adapted to assure equal flow of liquid to be clarified into each of the multiple manifold flow means or inlet chambers 30. For this purpose, a partition 48 divides the feedbox 46 from both of the inlet manifold chambers 30 with liquid flow therebetween being regulated by V-shaped weirs indicated at 50.

Each of the multiple inlet manifold chambers 30 contains an overflow control device indicated at 52. The overflow control devices 52 have a primary purpose of evenly distributing liquid to be clarified along the length of the respective inlet manifold chamber 30 so that liquid to be clarified passes uniformly into the inclined flow passages 28. The overflow control device 52, which also has another important function within the present clarifier, is described in greater detail below.

As liquid flows along the inclined passages 28, sediment tends to settle upon the upwardly facing surface of each inclined plate 26. The sediment then travels downwardly along the surface of the inclined plates either under the effect of gravity or possibly under the additional influence of means such as a mechanical vibrator (not shown). Liquid which is clarified during its passage downwardly through the inclined flow passages 28 is then directed into the second manifold flow means or vertical chamber 40 as described immediately below.

Referring particularly to FIG. 3, a divider plate 54 is secured in spaced-apart relation to the underside 51 of each inclined plate 26 adjacent its lower end. Since sediment tends to collect and travel along the upper side of each inclined plate, the divider plates 54 in conjunction with the adjacent undersides of the inclined plates 26 form divided regions 56 which receive clarified liquid as it passes downwardly along the inclined flow passages 28. The divided regions 56 are in communication with the vertical manifold flow chamber 40 by openings 58 formed in a partition 60 arranged between the lateral ends of the inclined plates 26 and the vertical chamber 40. The shape and height of the openings 58 are of particular importance in determining the quality of clarified liquid which passes into the vertical manifold 40. The effective height for the openings 58 is established by the edge 62 of an additional plate 64 arranged within the vertical manifold 40.

Clarified liquid entering the vertical manifold 40 flows toward an outlet or external conduit which may be best seen at 66 in FIGS. 3 and 4. Overflow control means 68 are also arranged within the vertical manifold 40 in order to regulate liquid flow between the openings 58 at the base of the inclined flow passages and the outlet or external conduit 66. The overflow control means 68 within the vertical chamber 40 may be seen in FIGS. 1, 2 and 4 as comprising a vertical weir box. Referring particularly to FIG. 4, the overflow weir 68 extends a substantial portion of the vertical height of the chamber 40 in order to accomplish at least two functions. Initially, it is thus possible to arrange the external conduit or outlet 68 at substantially any height along the clarifying section 24 of the housing. Referring also to FIGS. 1 and 2, it may be seen that the conduit 66 could be mounted upon either inclined wall of the clarifying section 24.

In addition, again having particular reference to FIG. 4, the effective liquid level within the vertical manifold chamber 40 is established by the upper edges 70 of the weir box 68. Similarly, liquid entering the dual manifold chambers 30 through the V-shaped weirs 50 must first flow over the upper edges 72 of the overflow control means 52. With the edges 70 and 72 arranged at the same heights, a continuous liquid level is assured throughout the entire clarifier during operation. Because of this arrangement, it is virtually impossible for any portion of the clarifier to be accidentally evacuated by siphon action.

It may be seen from the preceding discussion that sediment or solids entrained within liquid to be clarified and passing downwardly through the flow passages 28 tends to separate out under the influence of gravity and accumulate within the sedimentation chamber 36. In many liquids to be clarified, there is also an entrained low density phase. For example, various oils may be entrained within an aqueous liquid. The overflow control means 52 preferably includes integral means for collecting this low density or oil phase and communicating it to a low density outlet conduit 74, (see FIGS. 2 and 3) which is contained within a low density phase manifold 76.

Before proceeding with a detailed description as to construction of the overflow means 52, it is noted particularly with reference to FIG. 3 that a low density phase collection passage 78 is formed along the underside of each inclined plate 26 adjacent its upper end. This low density collection passage is formed by an inverted L-shaped plate secured to a vertically extending portion 80 at the upper end of each inclined plate. Referring momentarily to FIG. 4, each of the L-shaped collector plates 78 is interrupted along a substantial central length beneath the overflow control means 52. In this manner, a low density phase such as oil originally entrained within an aqueous liquid tends to collect under the L-shaped collection plates 78. The low density phase or oil then flows along the L-shaped collection channel and escapes upwardly under the overflow control means 52.

Referring to the preceding discussion, it may thus be seen that liquid to be clarified flowing over the V-shaped weirs enters the tops of the overflow control means 52 while the low density phase or oil collected along the passages 78 approaches the bottom of the overflow control means 52. For this reason, each of the overflow control devices 52 is formed with a pair of vertical side walls 82 with an inclined ramp or floor 84 arranged therebetween. Adjacent the V-shaped weirs 50, the ramp 84 is secured to the lower edges of the side walls 82. Adjacent the low density collection manifold 76, the inclined ramp 84 is secured to the upper surfaces of the side walls 82. Liquid to be clarified passes over the V-shaped weirs 50 and flows into a trough formed between the two side walls 82 above the ramp 84. As best seen in FIG. 3, there is a relatively greater flow volume within the trough 52 adjacent the V-shaped weir 50 as compared to its other end adjacent the low density collection manifold 76. The overflow control device 52 thus automatically distributes liquid to be clarified into all of the inclined flow passages 28.

At the same time, the low density phase or oil collected along the passages 78 rises upwardly into a similar trough formed between the vertical side walls 82 and beneath the ramp 84. Here again, the increased volume of the trough beneath the ramp 84 adjacent the low density collection manifold 76 serves a similar function of regulating flow of the low density oil therealong. Thus, the low density phase flows uniformly from the collection passages 78 for the various inclined flow passages toward the manifold 76.

As may be best seen in FIG. 3, a partition 86 divides the manifold 76 from the multiple manifold chambers 30 and the vertical chamber 40 while having an opening indicated at 88 for allowing the low density phase to pass into the manifold 76. The outlet conduit 74 within the manifold 76 also has an upper edge 90 which establishes a normal operating liquid level therein. Through the arrangement of the present invention, the manifold 76 may be approximately horizontal with both the inlet manifold chambers 30 as well as the top of the vertical manifold chamber 40. In addition, the upper edge 90 of the outlet conduit 74 is approximately level with the upper edges 72 for the overflow control means 52. Thus, the design of the low density phase collection arrangement including the manifold 76 is designed to further facilitate close regulation over liquid levels throughout the clarifier.

The design of the overflow control device 52 and the centrally open collection passages 78 also contributes to maintenance of the clarifier. With the overflow control device being movably mounted, for example, by hinges (not shown), the entire device 52 may be raised with the centrally open passages permitting ready access for means (not shown) to clean the surfaces of the inclined plates 26.

Before proceeding with an operational description as to the reversible character of the clarifier, it is first noted that the arrangement whereby the divided flow regions 56 are in communication with the vertical manifold chamber 40 is illustrated in substantially greater detail within FIG. 7. The upper ends of the divider plates 54 are tapered or bent toward the undersides of the adjacent inclined plates 26. A pressure drop is thus selectively established between the inclined flow passages 28 and the divided flow regions 56. The bent upper edges of the divider plates 54 are indicated at 92 and in effect form restrictive passages in combination with the undersides of the adjacent inclined plates. The pressure drop may be of significance in adjusting or regulating fluid flow between the divided regions 56 and the inclined flow passages 28 in order to avoid the introduction of turbulence, for example. Similarly, the construction of the low density phase collection channel 78 is illustrated in somewhat greater detail in FIG. 8. Referring in combination to FIG. 8 and FIGS. 3 and 4, the collection passages 78 may be inclined upwardly toward the trough formed beneath the overflow control means 52. In this manner, flow of the low density material or oil is assured toward the overflow control means. There is less likelihood of the clarifier becoming clogged and there is also substantially no need for sealing means adjacent the ends of the collection passages 78 opposite from the overflow control means 52.

Figure 5:
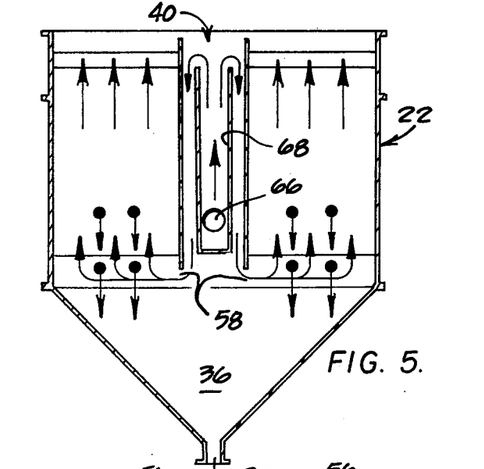
FIGS. 5 and 6 are simple schematic representations of the clarifier, generally similar to the view of FIG. 4, illustrating operation of the clarifier in a "downflow" and "upflow" mode of operation, respectively.
Figure 6:
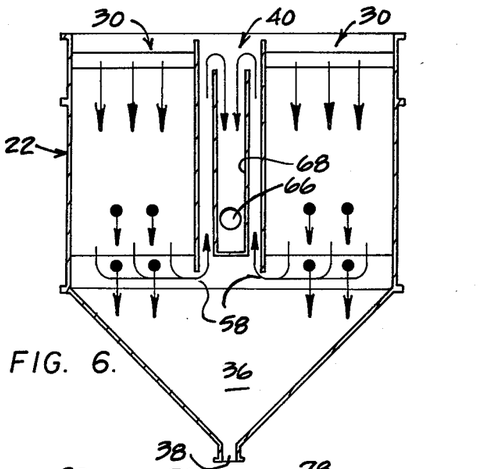

FIGS. 5 and 6 illustrate that the present clarifier, as described above in substantial detail in connection with FIGS. 1-4, 7 and 8, may be reversibly operable in either a downflow mode of operation (FIG. 6) or an upflow mode of operation (FIG. 5). In either mode of operation, sediment or solids, having a tendency to settle under the influence of gravity, uniformly travels downwardly toward the sedimentation chamber 36. It must be kept in mind that most clarification applications do not involve the simple removal of sediment or solids having uniform size and weight. Accordingly, it is often necessary to closely control the design of the clarifier in order to assure proper removal of one or more phases.

For example, a liquid to be clarified may include solids of various sizes and densities as well as one or more low density phases such as oil entrained within an aqueous liquid. It is therefore not always possible to assure flow of liquid to be clarified through the inclined passages in the same direction with a selected phase being removed therefrom. Within such a situation, solids or sediment would be passing downwardly toward the sedimentation chamber 36 while low density materials such as oil would be passing upwardly toward the collection passages 78. The present clarifier permits ready adjustment of flow rates through the clarifier, liquid levels within the clarifier and even the direction of flow for liquid to be clarified.

The functions of the two external conduits 44 and 66 may be readily reversed in order to accomplish either upflow or downflow modes of operation. With the conduit 44 serving as an inlet in the manner described above, the clarifier would be operating in a downflow mode as schematically illustrated in FIG. 6. However, with the conduit 44 being an outlet and the other conduit 66 being an inlet, the clarifier is conditioned for operation in an upflow mode as schematically represented in FIG. 5.

With the clarifier operating in its upflow mode (see FIG. 5), the dual manifold chambers 30 serve as outlet manifolds with the vertical manifold chamber 40 serving as an inlet flow manifold. The upper edges 70 for the overflow control weir box 68 regulate the level of liquid flowing into the clarifier. Liquid flowing upwardly into the manifold chambers 30 passes over the edges 72 into the flow control device 52 and through the V-shaped weirs 50 to the conduit 44. The overflow control device 52 continues to provide the same function of directing a low density phase or oil toward the manifold 76.

Downflow operation of the clarifier is particularly contemplated for assuring maximum removal of low density material from a liquid to be clarified. As indicated above, this method is useful where the influent is an aqueous liquid including low density hydrocarbons in the form of either liquids or solids. It is of course possible that relatively high density solids or even liquids could be simultaneously removed from liquid to be clarified at the lower ends of the inclined passages.

Operation of the clarifier in such a downflow mode is also illustrated by FIG. 6. During flow of the liquid downwardly through the passages 28, the low density material tends to rise toward the collection channels 78 (see FIG. 3). With operating characteristics of the clarifier such as the rate of liquid flow therethrough being closely regulated, substantially all of the low density material capable of removal within the clarifier may be extracted from liquid to be clarified substantially before it arrives at the lower ends of the inclined passages 28. In this manner, there is substantially no tendency for the effluent liquid to pick up or entrain any of the low density material through the "wiping" effect referred to above.

Within this method, the low density material is collected at the upper ends of the inclined passages, for example, by the low density channels 78. It will be further apparent that the rate or quality of clarification within such a method of operation could be further enhanced, for example, by the use of multiple low density collection channels such as described below in connection with FIG. 11. Thus, an intermediate low density phase could be recycled through the clarifier to even further improve either the rate or quality of clarification.

A variation of this downflow method is also possible, for example, where it is more difficult to complete removal of the low density material from the liquid flowing downwardly through the inclined passages. In such a method, an intermediate phase could be withdrawn adjacent the bottom of the inclined passages and recycled for combination with fresh influent liquid entering the clarifier. In many applications, such recycling may tend to promote the more complete removal of low density materials from the liquid.

A number of additional features embodied within a clarifier or settler are described below with specific reference to one or more of FIGS. 9–16. Each of the features described below may be employed with the reversible clarifier of FIGS. 1–8. However, it is important to note that one or more of these features may also be used either alone or together with additional features of the invention in other inclined passage clarifiers.

Referring now to FIG. 9, a multiple phase separation arrangement is illustrated whereby a plurality of phases are removed at the lower ends of the inclined flow passages 28. Initially, the clarifier elements illustrated in FIG. 9 which correspond to elements previously discussed with reference to FIG. 7 are indicated by the same numerals. For example, the same divided regions 56 are formed adjacent the undersides of each inclined plate 26 with openings 58 communicating the divided regions 56 with the vertical manifold chamber 40 (see FIG. 4).

However, an additional divider plate 102 is arranged in spaced-apart relation to each of the divider plates 54 so that a second or intermediate divided region 104 is also provided. The additional divider plates 102 may similarly have tapered or bent upper ends 106 for developing a pressure differential between the intermediate divided region 104 and each of the inclined flow passages 28.

Second manifold means are employed to receive the intermediate liquid phase from the intermediate divided region 104. For example, openings 108, similar to the openings 58, may be provided for communicating the intermediate divided regions 104 with a second manifold means generally indicated at 110 in FIG. 9. The second manifold 110 is better illustrated in FIG. 10 wherein two such manifolds are employed along opposite sides of the clarifier. This arrangement provides a simple means for maintaining separate manifold communication with the two sets of divided regions. For example, referring to FIG. 10, clarified liquid flowing downwardly through the inclined passages may have different phases flowing into the divided regions 56 and 104. The phase flowing into the divided regions 56 passes into the centrally arranged vertical manifold 40 while the intermediate phase in the divided regions 104 flows outwardly to the manifolds 110. Exemplary conduit means are illustrated in connection with the manifolds 110 for receiving clarifier liquid therefrom. Preferably, the conduits 112 are arranged to communicate the intermediate liquid phase back to an inlet for the clarifier, possibly either of the external conduits 44 and 66 of FIG. 3.

This arrangement is particularly contemplated for improving either the rate or quality of clarification for liquids being processed. For example, a relatively clear phase may be recovered from the divided region 56 through the vertical manifold chamber 40. At the same time, an additional intermediate phase may be recovered within the intermediate divided regions 104. Such a phase may still have recoverable material in suspension. Accordingly, the intermediate phase may be recycled so that the additional suspended material may be recovered during a second passage of the liquid through the inclined flow passages 28.

A similar multiple phase recovery arrangement is also illustrated in FIG. 11 for use at the upper ends of the inclined flow passages 28. Here again, recovery of a low density phase such as oil may take place at such a rate that a relatively clear phase can be recovered within the low density collection passages 76. Within the embodiment of FIG. 11, a second collection passage 114 is formed adjacent each of the collection passages 78 in order to similarly recover a second intermediate low density phase. As in the multiple phase arrangement of FIG. 9, a second manifold means 116 is provided to receive the liquid phase recovered within the intermediate collection passages 114. The intermediate phase recovered within the intermediate passages 114 and the manifold means 116 may be recirculated through the clarifier in the same manner described above in connection with FIGS. 9 and 10.

FIGS. 11 and 12 illustrate a different low density phase collection arrangement which may be employed for example within each of the manifold flow means 30 at the top of the clarifier as best seen in FIGS. 1, 3 and 4. Here again, many components of the clarifier as illustrated in FIGS. 12 and 13 correspond with elements of the clarifier described above in connection with FIGS. 1-4. The similar elements are identified by the same numerical labels. Similar low density phase collection passages 78' are employed. However, the collection passages 78' in the embodiment of FIGS. 12 and 13 extend completely across the respective manifold chambers 30 rather than being open in the center as described above for the passages 78 of FIG. 4. The overflow control device 52' of FIGS. 12 and 13 does not perform the function of communicating the low density phase or oil into a low density manifold. Rather, within the embodiment of FIGS. 12 and 13, low density phase manifolds are formed along each lateral edge of the upper housing section 32. The low density manifolds are indicated by the numeral 122. Referring particularly to FIG. 13, each of the collection passages 78' is open beneath the respective low density manifold 122 so that low density phase liquid collected therein tends to flow freely into the low density manifold. Each of the low density manifolds 112 is preferably formed in a particularly simple manner by means of a partition plate 124 which extends along the tops of the inclined plates 26. The overflow control device 52' is somewhat different from that described above in connection with FIG. 4 in that its inclined ramp is formed as a V-shaped member 84'. Outlet conduits 126 are employed within the low density manifolds 122 for regulating the passage of low density phase liquid therefrom.

Referring now to FIG. 14, an inclined passage clarifier 130 is illustrated which may be similar to that described above in FIGS. 1-8. Support structure 132 is provided for mounting the lower end of the clarifier. A novel arrangement is contemplated for the clarifier of FIG. 14 wherein support means for the upper end of the clarifier are combined with a vertical chamber suitable for the introduction of flocculating material into liquid to be clarified prior to its passage into the clarifier. The invention contemplated in this embodiment is particularly useful with a clarifier having an inlet manifold or conduit at its upper end.

A fabricated column 134 is secured to the upper end of the clarifier 130 and extends downwardly to provide support therefor. At the same time, the column 134 internally forms a vertical chamber 136 which is in communication with the upper inlet manifold described above for the clarifier 130 by means of a passage 138. An inlet conduit 140 is arranged generally in facing relation with the passage 138. A vertical baffle 142 extends across the chamber 136 to separate the passage 138 from the inlet 140. The baffle extends downwardly to form an opening 144 at the base of the chamber 136 through which liquid may be communicated from the inlet conduit 140 to the passage 138. The baffle chamber 136 is particularly adapted to develop turbulence suitable for introduction of flocculating material into the liquid to be clarified.

Finally, within the embodiment illustrated in FIGS. 15 and 16, a novel arrangement permits the development of a liquid seal between one of the inclined plates 26 and a similarly inclined wall of the clarifier. The inclined wall of the clarifier is generally indicated at 150. After a number of the inclined plates 26 are arranged within the clarifying section of the housing, a variable distance may be left between an end inclined plate and the adjacent housing 150. In order to close that space and assure a liquid seal thereacross, a pair of channel members are disposed between the plate and the wall in facing relation. The channel members are indicated at 152 and 154, each of the channel members being U-shaped and arranged in facing relation with each other to form an enclosed column therebetween. The enclosed column is generally indicated at 156. One of the channel members is secured, for example, by spot welding, to the respective inclined plate or housing wall in order to assure proper location of both channel members. With the channel members arranged in the manner illustrated, the internal column 156 is formed with an expansible material such as sand or the like. The expansible material tends to urge the channel members apart into respective engagement with the inclined plate and housing wall in order to maintain a seal therebetween.

It will be obvious that a similar sealing arrangement may be employed along each lateral edge for the inclined plate adjacent the similarly inclined housing wall 150.

It is believed readily apparent from the preceding description that many additional modifications are possible within the scope of the present invention. Accordingly, the scope of the present invention is to be determined only from the following appended claims.

What is claimed is:

1. In a clarifier having flow passages formed by a plurality of spaced-apart parallel plates mounted in inclined relation within a housing, the improvement comprising first manifold flow means formed by the housing above the plates in communication with each of the flow passages formed therebetween, first conduit means in communication with the first manifold flow means, first overflow control means regulating liquid flow through the first manifold flow means between the first conduit means and the flow passages, a flow divider plate arranged in spaced-apart relation from the underside of each of the parallel plates and adjacent the lower end thereof while substantially spanning the width of the plate to form a partially enclosed region in communication with each flow passage, a plate means extending transversely of the inclined plates and forming passages for respective communication with the enclosed region for each flow passage, second manifold flow means formed by the housing in communication with the passages in the plate means and the enclosed regions formed between the parallel plates and respective divider plates, second conduit means in communication with the second manifold flow means, and second overflow control means regulating liquid flow through the second manifold flow means, the first and second conduit means being interchangeably employable as inlet and outlet means for the clarifier whereby the clarifier may be selectively adapted for reversible operation in either an upflow or downflow mode.

2. The clarifier of claim 1 wherein the effective overflow levels for the first and second overflow means are arranged to approximately the same elevation to assure that the clarifier remains filled with liquid in either an upflow or downflow mode of operation by establishing the liquid level in the first and second manifold flow means respectively.

3. The clarifier of claim 1 wherein a sediment collection chamber is formed by the housing beneath the spaced-apart inclined plates and in communication with the flow passages.

4. The clarifier of claim 1 comprising collection channel means formed along the underside and adjacent the upwardly extending end of each of the inclined plates for collecting a low density phase, the first flow control means comprising a trough having spaced-apart side walls and an inclined floor, the trough being in communication above the inclined floor with the first conduit means, the trough also being in communication below the inclined floor with the collection channel means and with an additional outlet conduit for receiving the low density phase.

5. In a clarifier of a type including a plurality of parallel spaced-apart plates mounted in inclined relation within a housing to form flow passages therebetween and means for causing liquid to be clarified to flow along the flow passages, the housing also forming a manifold flow chamber above the plates in communication with the respective passages formed therebetween and with a first outlet conduit, the improvement comprising collection channel means formed within each respective passage by an L-shaped divider plate having a downwardly extending leg arranged in spaced-apart relation from the underside of each inclined plate and adjacent the upper inclined end thereof, the housing forming a low density phase outlet conduit means in communication with the collection channel means for receiving a low density phase therefrom and a flow control means arranged within the manifold flow chamber for regulating liquid flow between the passages formed by the inclined plates and the first conduit, the flow regulating means including integral means for communicating the low density phase from the collection channel means with the low density phase conduit means wherein the low density phase collection channel means extends along a lateral portion of the passage between each pair of inclined plates, the flow control means comprising a trough having spaced apart side walls and an inclined floor arranged therebetween, the flow control means overlapping the remaining lateral portion of the passages in order to receive the low density phase beneath the inclined floor for communication to the low density phase outlet conduit means, the flow control means being movably mounted in order to provide ready access to the flow passages between the inclined plates.

6. In a clarifier of a type including a plurality of parallel spaced-apart plates mounted in inclined relation within a housing to form flow passages therebetween and means for causing liquid to be clarified to flow along the flow passages, the housing also forming a manifold flow chamber above the plates in communication with the respective passages formed therebetween and with a first outlet conduit, the improvement comprising collection channel means formed within each respective passage by an L-shaped divider plate having a downwardly extending leg arranged in spaced-apart relation from the underside of each inclined plate and adjacent the upper inclined end thereof, the housing forming a low density phase outlet conduit means in communication with the collection channel means for receiving a low density phase therefrom and a flow control means arranged within the manifold flow chamber for regulating liquid flow between the passaged formed by the inclined plates and the first conduit, the flow regulating means including integral means for communicating the low density phase from the collection channel means with the low density phase conduit means wherein the first flow control means comprises a trough having spaced-apart side walls and an inclined floor arranged therebetween, the trough being in communication above the inclined floor with the first conduit by means of an overflow weir positioned between said first conduit and said trough, said trough extending transversely to said collection passages the trough also being in communication below the inclined floor with the collection passages and with the low density phase outlet conduit means for receiving the low density phase.

7. In a clarifier including a plurality of spaced-apart parallel plates arranged in inclined relation within a housing to form inclined flow passages therebetween, the housing also forming a manifold flow chamber above the plates in communication with each of the flow passages, the improvement comprising an L-shaped divider plate means mounted with an upwardly extending portion in parallel spaced-apart relation from the underside of each inclined plate adjacent the lower end thereof and forming a divided flow region between each inclined plate and the respective divider plate means, a vertically extending manifold flow means formed by the housing and extending along a lateral edge of the inclined plates, a vertical partition plate separating the vertical manifold flow means from the flow passages while forming openings permitting communication between the vertical manifold flow means and the divided flow regions formed by each of the inclined plates and the adjacent divider plate means, conduit means in communication with the vertical manifold flow means, and overflow weir means arranged within the vertical manifold flow means to regulate liquid flow through the vertical manifold flow means between the conduit means and the openings formed by the vertical partition plate.

8. The clarifier of claim 7 wherein the overflow weir means internally defines a vertical flow column open at its top and in communication with the conduit means whereby the conduit means may be arranged at substantially any selected level along the vertical flow column.

9. In a clarifier including a plurality of parallel, spaced-apart plates arranged in inclined relation within a housing to form inclined flow passages therebetween, the housing also forming first and second manifold flow chambers in communication respectively with the upper and lower ends of the flow passages and inlet and outlet conduit means for directing liquid through the manifold flow chambers and the inclined flow passages, the improvement comprising a multiple phase separation means adjacent at least one vertical end of each respective flow passage, each multiple phase separation means comprising a pair of L-shaped divider plates having legs mounted in spaced-apart relation to each other and the respective inclined plate adjacent a vertical end thereof to form two divided flow regions, separate manifold means being in respective communication with the divided flow region formed by each inclined plate and the adjacent divider plate as well as the divided flow region formed by the two divider plates.

10. The clarifier of claim 9 further comprising means in communication with the divided flow region between the two spaced-apart divider plates and with the inlet means to recycle an intermediate partially clarified liquid phase back to the inclined flow passages formed between the inclined plates.

11. The clarifier of claim 9 comprising similar multiple separation means and dual manifold means arranged in communication with both the upper and lower ends of the flow passages between the inclined plates.

12. In a clarifier including a housing having a trapezoidal configuration in cross-section and defining a clarifier section including a plurality of parallel spaced-apart plates arranged in inclined relation in the housing to form inclined flow passages therebetween, the housing also forming an inlet manifold chamber above the inclined plates in communication with the flow passages therebetween for introducing liquid to be clarified into the inclined flow passages between the inclined plates, and means for receiving clarified liquid from the lower ends of the flow passages, a suitable support structure providing a mounting for the lower end of the housing, the improvement comprising a combination support structure for the upper end of the housing and a flocculating chamber for introducing flocculating material into liquid to be clarified prior to its passage into the inlet manifold chamber, the combined support structure and flocculating chamber comprising a hollow structure supporting the upper end of the housing and extending downwardly to provide support therefor, the hollow support structure internally forming a vertical chamber having inlet and outlet means in communication with an upper end thereof, the outlet means communicating the vertical chamber with the inlet manifold, the vertical chamber including a vertical baffle separating the inlet and outlet means and extending downwardly to divide the vertical chamber into two portions with an interconnecting passage beneath the vertical baffle at the bottom of the vertical chamber.

13. In a clarifier of a type including a housing having a trapezoidal configuration in cross-section and defining a clarifier section including a plurality of parallel spaced-apart plates arranged in inclined relation within the housing to form inclined flow passages therebetween, the housing also defining an inlet and outlet means for communicating liquid to be clarified through the inclined flow passages between the inclined plates, the housing also including means for collecting a selected phase of material to be removed from the liquid and means for receiving clarified liquid from the lower ends of the flow passages, the improvement comprising means for supporting the inclined plates within the housing and for maintaining a liquid seal between one of the inclined plates and a similarly inclined wall of the housing, the support means comprising a support structure extending across the housing at the bottom of the clarifier section to receive the inclined plates, the seal means comprising at least one pair of channel members arranged in respective engagement with the one inclined plate and the similarly inclined housing wall, one of the channels being fixed in place, the channels being U-shaped and arranged in facing and overlapping relation to form a closed column, expandable means being arranged within the closed column to urge the U-shaped channel members apart into respective engagement with the one inclined plate and the similarly inclined housing wall.

* * * * *